United States Patent Office 3,163,197
Patented Dec. 29, 1964

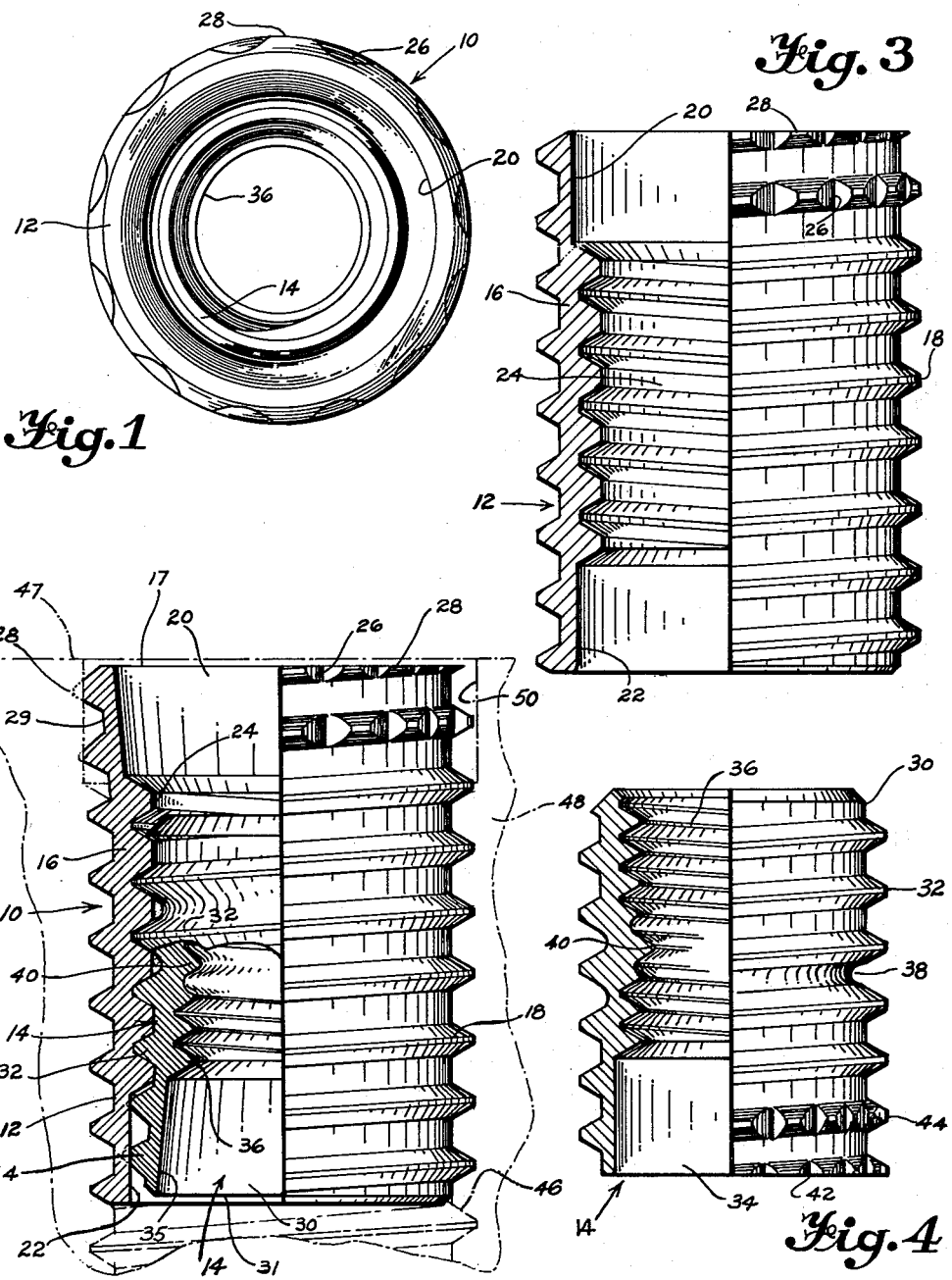

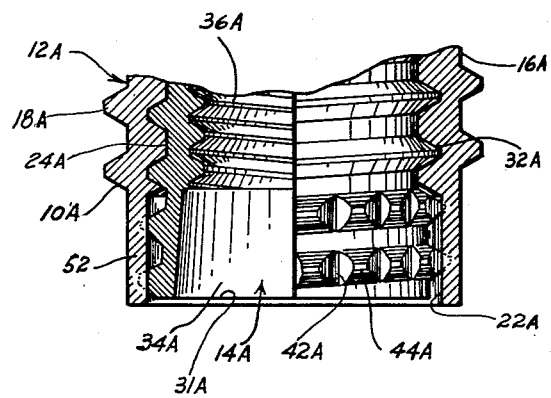
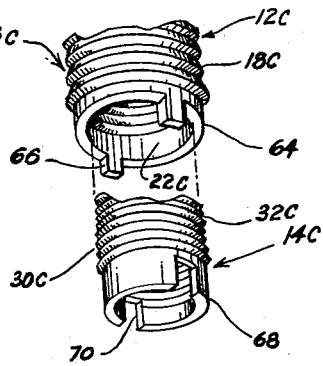
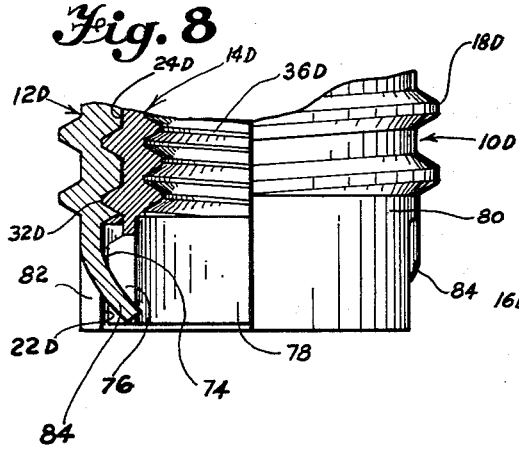
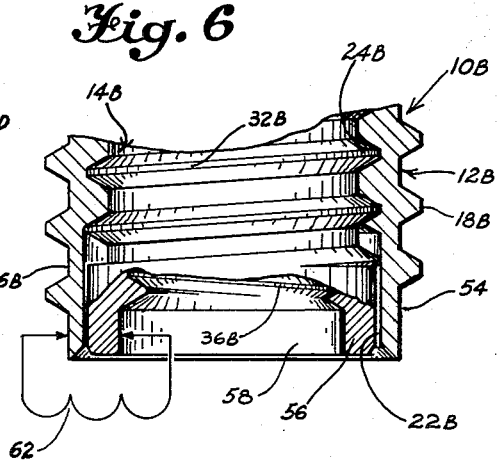

3,163,197
TWO-PIECE INSERT
José Rosán, San Juan Capistrano, and Albert Jack La Torre, Santa Ana, Calif., assignors to Rosan Engineering Corporation, a corporation of California
Filed Jan. 9, 1961, Ser. No. 81,303
5 Claims. (Cl. 151—41.73)

This invention relates to a novel insert construction, and more specifically to a two-piece insert comprising a pair of interengaging tubular internally and externally threaded members, one of which is adapted to be received and locked within a threaded bore or socket in a parent body, and the other is adapted to be received and locked within the first member. The inner threaded member is adapted to receive and lock in position a third externally threaded member.

The invention finds special, though not exclusive application, in cases wherein it is desired to fasten parts to a body of relatively soft or malleable material, such as aluminum, magnesium, alloys of aluminum and magnesium, and the like, as, for example, in aircraft construction, especially in cases where it is desired or required to remove or replace the part to be fastened. It has been found that repeated removal and insertion of threaded fasteners in a threaded bore of malleable material soon causes galling of the threaded bore, making it impossible to obtain a tight connection.

It has been suggested to use a threaded insert of harder material, such as steel, and to connect the fastener element to the insert. This arrangement has been satisfactory. In the use of such threaded inserts, it has been found advisable to lock the insert in the threaded bore of the parent body, as there is a tendency for the insert to work loose in the absence of some locking means. One of the arrangements heretofore used involves the use of locking rings or similar structure, which have proved to be effective. The present invention affords a cost reduction over such means, however.

It is an object of the invention, therefore, to provide a novel insert that is simple in construction and which can be readily locked in a threaded bore in a parent body with or without the use of additional parts, such as locking rings and the like.

It is a further object to provide a novel two-piece threaded insert consisting of a pair of interfitting threaded sleeves, the outer of which can be locally deformed into locking engagement with a body of parent material, and the inner of which can be locally deformed into locking engagement with the outer sleeve.

It is a still further object to provide a novel two-piece threaded insert consisting of a pair of interfitting threaded sleeves of relatively hard material, the inner of which is adapted to receive a threaded fastening element, and which can readily be replaced when worn or when desired.

It is a still further object to provide a novel two-piece insert consisting of a pair of interfitting threaded sleeves, in which one end of the outer sleeve has a locking formation adapted to be spread outwardly into locking engagement with the surrounding material of a parent body, and in which the inner sleeve is interlocked with the other end of the outer sleeve.

The attainment of the above objects, as well as other objects, will be evident from the following description when considered with the attached drawings in which:

FIGURE 1 is a top plan view of a first embodiment of a two-piece insert;

FIGURE 2 is an elevation view in quarter section of the first embodiment in locked position within a threaded bore or socket of a parent body shown in broken lines;

FIGURE 3 is an elevation view in quarter section of the outer tubular member of the two-piece insert of FIGURES 1 and 2;

FIGURE 4 is an elevation view in quarter section of the inner tubular member of the two-piece insert of FIGURES 1 and 2;

FIGURE 5 is a sectional view with a quarter elevation of the inner tubular member of a second embodiment of a two-piece insert;

FIGURE 6 is a partial sectional view of a third embodiment of a two-piece insert;

FIGURE 7 is an exploded view of a fourth embodiment of a two-piece insert; and

FIGURE 8 is an elevation view, in quarter section, of a variation of the embodiment of FIGURE 7.

In the form of the invention shown in FIGURES 1 to 4, the insert in its entirety is designated by the numeral 10, and comprises an outer tubular member or sleeve 12, and an inner tubular member or sleeve 14, the inner sleeve adapted to interfit the outer sleeve, as described hereinafter.

The outer tubular member 12 comprises a cylindrical body 16 having external threads 18 extending throughout its entire length, and an internally threaded bore forming threads 24 defined between counterbores 20 and 22. The counterbores 20 and 22 may have the same or different diameters, but the diameter should be at least equal to the root diameter of the internal threads 24, to allow the internal threaded member to enter the outer tubular member, as appearing hereinafter. One or two convolutions on one end of the external threads 18 are knurled to form a series of spaced axial grooves 26 alternating with serrations 28. As shown, these serrations are formed on the upper end, but, since the tubular member 12 is symmetrical, it is evident that these serrations can be formed on either end, or if desired, on both ends.

The inner tubular member 14 comprises a substantially cylindrical body 30 having external threads 32 extending throughout the length thereof, an internally threaded bore having internal threads 36, having within one end 31 a counterbore 34 as seen in FIGURE 4. The counterbore 34 has a cylindrical wall with a diameter at least as great as the root diameter of the internal threads 36. Intermediate the ends of the external threads 32, the roots are inwardly deformed, as shown at 38, to produce an internal enlargement 40 causing an interference fit with the external threads of a fastener, not shown, that may be threaded in mating relation with the internal threads 36. A series of axial grooves 42 are formed, as by knurling, in one or two convolutions adjoining the end of the external threads 32 in the zone surrounding the counterbore 34, to form a series of serrations 44 for a purpose to be set forth hereinafter.

The insert 10 is adapted to be threaded into an internally threaded bore or socket 46 of a parent body 48, having a smooth wall counterbore 50, shown in dotted lines in FIGURE 2. The diameter and pitch of the internally threaded bore 46 correspond to those of the external threads 18 on the outer tubular member 12, and the diameter of the counterbore is slightly larger than the crest diameter of the external threads 18, so that there will be no interference with the threading of the tubular member 12 into the parent body 48 from the upper end shown in FIGURE 2. The outer tubular member 12 may be screwed into the threaded bore 46 to the position shown in FIGURE 2 in which the upper end 17 of the tubular member lies slightly below the upper surface 47 of the parent body 48.

The parent body 48 may be some metallic structure such as an airplane wing, fuselage, cowling or other part, made of relatively soft or malleable material such as aluminum, magnesium, and alloys of aluminum or magnesium or other metal, while the insert 10 may be made of a much harder material, such as, for example, steel, cast iron, or the like. Various materials may be employed, but it is important that the material of the insert must be considerably harder or less malleable than the material of the parent body in which it is inserted. For example, both the parent body and the insert may be made of steel, or they both may be made of plastics, but in either event, the insert must be made of harder material.

With outer tubular member 12 of insert 10 in the position shown in FIGURE 2, a suitable expander tool may be inserted into the upper end thereof, in the zone defined by the counterbore 20, and radial pressure applied to the wall of the counterbore to produce a flare, as shown in the upper left hand corner of FIGURE 2, which will force the serrations 28 into the malleable material forming the wall of the counterbore 20, displacing some of this material into the channel 29 between consecutive convolutions or into the grooves 26, thereby forming a locking interconnection between the locking formations or serrations 28 and the body of parent material 48. The inner tubular member 14 may then be threaded into the outer tubular member 12 into a position corresponding to that shown in FIGURE 2, in which the lower end of the threads 32 lie in the zone defined by the counterbore 22. The inner tubular member 14 may be inserted from either end of the outer tubular member, depending upon whether the internally threaded bore 46 is formed in an aperture or in a socket. When so positioned, an expander tool can be positioned in the zone formed by the counterbore 34, and a radial pressure applied to the wall circumferentially in the area indicated at 35 to force the serrations 44 into the material of the cylindrical body 16, as shown in the lower left hand corner of FIGURE 2, providing a locking interconnection between the locking formations on the cylindrical body 30 and the wall of the counterbore 22.

It will be understood that the inner tubular member 14 may be threaded into the outer tubular member 12 before the insert, as a whole, is threaded in the threaded bore 46, and the walls then expanded to obtain the above locking connections, or, if preferred, the outer tubular member may first be inserted, and the inner tubular member 14 can then be inserted, and the walls flared outward simultaneously or in turn, as desired, or spot, butt or fusion welded.

FIGURE 5 illustrates a modification of the insert of FIGURES 1 to 4 in which one end of the outer tubular member, opposite the end carrying the locking formations or serrations (not shown), is cylindrical and free from internal and external threads. Only the lower end of the insert is shown in FIGURE 5, and the parts thereof, corresponding to the parts of the modification shown in FIGURES 1 to 4, are designated by the same reference numeral with the addition of the letter "A."

It will be noted that the external threads 18A on the outer tubular member 12A do not extend the full length of the cylindrical body 16A, but terminate a short distance from the lower end 31A thereof, to provide a cylindrical portion 52, having a counterbore 22A. In this form of the invention, the inner and outer members are interlocked in the same manner described in connection with the modification of FIGURES 1 to 4. This form of the invention can be used in a socket or aperture in a parent body in the same manner as shown in FIGURE 2, but finds special application in situations where the insert is longer than the aperture in the parent body, whereby the cylindrical portion 52 may extend beyond the surface of the tubular body. In such arrangement, a ring or backing tool can be applied around the cylindrical portion 52 to prevent flaring or deformation thereof when the lower end of the inner tubular body 14A is expanded or flared, as shown.

FIGURE 6 illustrates a sightly modified form of the invention shown in FIGURES 1 to 4, having a different arrangement for interlocking the inner and outer tubular members 14B and 12B, respectively. In this form of the invention, the outer and inner tubular members are similar to those shown in FIGURES 1 to 4, and corresponding parts are designated by the same reference numerals with the addition of the letter "B." The upper ends of these members are identical, with those in FIGURES 1 to 4, and have not been illustrated in FIGURE 6. The external threads 18B extend nearly the full length of the cylindrical body 16B, terminating a short distance from the lower end thereof to provide a cylindrical portion 54 having a smooth outer wall, and a smooth inner wall formed by a counterbore 22B. The external threads 32B on the inner tubular member 14B terminate a short distance from the lower end thereof, forming a cylindrical portion 56 having a diameter substantially the same, or slightly smaller, than the diameter of the counterbore 22B. This cylindrical portion 56 is provided with a counterbore 58. A locking interconnection between the lower ends of the outer tubular member 12B and the inner tubular member 14B can be formed by a welded joint between the wall of the counterbore 22B and the outer wall of the cylindrical portion 56. The numeral 62 indicates diagrammatically a joint formed by engaging a pair of welding electrodes with opposed points on the wall of the counterbore 58, and the external wall of the cylindrical portion 54, during manufacture. Current may be passed therethru from a suitable source, not shown, to form a spot weld between the cylindrical portions 54 and 56, and the electrodes thereafter removed. It is evident, in order to obtain such a welded joint, that the cylindrical portions 54 and 56 should extend outside the threaded bore 46 in the parent body 48, as shown in FIGURE 2. It is also evident that, because of the diameter of the cylindrical portion 56, the inner tubular member 14B must be threaded from the bottom or lower end of the outer cylindrical member 12B of FIGURE 6.

If the cylindrical portions 54 and 56 do not extend beyond the threaded bore, a weld can be formed by other methods.

FIGURE 7 illustrates another modification of the form of insert shown in FIGURES 1 through 4, having a different form of interlocking arrangement between the outer tubular member 12C and the inner tubular member 14C. The upper or outer end of the insert is not illustrated in FIGURE 7, but is identical with that shown in FIGURES 1 through 4, and corresponding parts in FIGURE 7 are designated by the same numerals with the addition of the letter C. In this form of the invention, the external threads 18C on the cylindrical body 16C terminate somewhat short of the lower or inner end, to form a cylindrical portion 64 having a pair of axially extending, diametrically opposed, tongues 66. The external threads 32C on the cylindrical body 30C of the inner tubular member 14C terminate short of the lower end thereof, providing a cylindrical portion 68. A pair of diametrically opposed slots 70 are formed in the cylindrical portion 68, having a width and a length sufficient to receive the tongues 66 when the latter are deformed or bent inwardly to extend within the slots. In this form of the invention, the outer tubular member 12C and the inner tubular member 14C may be positioned within the threaded bore of a parent body, not shown, and the tongues 66 aligned with the slots 70, whereupon, by suitable tools, the tongues may be inwardly deformed to enter the slots 70. Such a deformation provides an easily formed and rigid interlock between the inner and outer tubular members. The advantage of this arrangement lies in the fact that the tongues can easily be deformed to their original position to facilitate removal and replacement of the inner tubular member 14C when desired.

It is evident that, alternatively, the tongues 66 can be provided in the inner tubular member 14C and the slots 70 in the outer tubular member 12C. It is also evident that the number of tongues need not be the same as the number of slots, or that the tongues and slots be oppositely disposed or equally spaced around the periphery. For instance, one or two tongues and a greater number, or even a single, slot may be provided.

FIGURE 8 illustrates a modified arrangement of the tongue and slot connection of FIGURE 7. The upper end of the insert 10D of FIGURE 8, not illustrated, is identical with that of FIGURES 1 through 4, and corresponding parts in FIGURE 8 are designated by the same reference numeral with the addition of the letter "D."

In FIGURE 8, the external threads 18D terminate a short distance from the lower end to form a cylindrical portion 80. Likewise, the external threads 32D on the inner tubular member 14D terminate a short distance from the lower end to form a smooth cylindrical portion 74. The threaded bore 36D in the inner tubular member 14D is counterbored at 78, the diameter thereof being at least as large as the root diameter of the internal threads 36D. The external diameter of the cylindrical portion 74 is shown as being somewhat greater than the diameter of the crest of the inner threads 24D and somewhat less than the diameter of the counterbore 22D in the outer tubular member 12D, to provide a thickened wall in which a plurality of axially extending slots 76 are formed. The cylindrical portion 80 of the outer sleeve is provided with spaced axially extending cuts 82 to form tongues 84. These tongues should have a width slightly less than the width of the slots 76, so as to be received within them when the tongues are inwardly deformed, as shown on the left hand side of FIGURE 8.

It is evident that this form of the invention provides an interlock between the outer tubular member 12D and the inner tubular member 14D, preventing relative rotation, and that when it is desired for any purpose to remove the inner tubular member, the tongues 84 can be bent outwardly, whereby the inner tubular member can easily be unscrewed and removed. While, in this illustration, a pair of diametrically opposed tongues 84 are received in a pair of diametrically opposed slots 76, the number and spacing of the tongues and slots can be varied, to permit locking at selected angular relative positions of the inner and outer tubular members.

In the form of the invention shown in FIGURE 8, it is evident that the inner tubular member 14D must be inserted from the lower end of the outer tubular member 12D because of the enlarged outer diameter of the cylindrical portion 74. However, if it is desired to insert the inner tubular member from the upper or outer end, the external diameter of the cylindrical portion 74 can be made not to exceed the diameter of the crests of the internal threads 24D of the outer tubular member 12D.

It is apparent that alterations and modifications can be resorted to without departing from the scope of the invention included within the appended claims.

We claim:

1. An insert comprising a pair of interfitting tubular members, the outer of said members provided with a counterbore at each end thereof, said outer member being internally and externally threaded, the outer threads being adapted to engage an internally threaded bore in a parent body, one end of said outer member including external serrations adapted to penetrate the wall of the bore of the parent body to lock said member in the bore, the inner of said members being externally and internally threaded, the external threads of said inner member being in threaded engagement with the inner threads of the outer member, said inner member being provided with a counterbore and external locking projections at one end thereof adapted to engage the counterbore of the outer member opposite the outer member end which is provided with external serrations, said counterbored portion of said inner member being deformed into non-rotatable locking engagement relative to the outer member.

2. An insert as defined in claim 1, in which the internal threads of the inner member include at least one deformed root convolution to provide an interference fit with a threaded fastener received therein.

3. An insert comprising a pair of interfitting tubular members, the outer of said members provided with a counterbore at each end thereof, said outer member being internally and externally threaded, the outer threads being adapted to engage an internally threaded bore in a parent body, one end of said outer member including external serrations adapted to penetrate the wall of the bore of the parent body to lock said member in the bore, the inner of said members being externally and internally threaded, the external threads of said inner member being in threaded engagement with the inner threads of the outer member, said inner member being provided with a counterbore adapted to engage the counterbore of the outer member opposite the outer member end which is provided with external serrations, said inner member being in non-rotatable locking engagement relative to said outer member by welded connection between the counterbored end of said inner member and the adjacent counterbored end of said outer member.

4. An insert comprising a pair of interfitting tubular members, the outer of said members provided with a counterbore at each end thereof, said outer member being internally and externally threaded, the outer threads being adapted to engage an internally threaded bore in a parent body, one end of said outer member including external serrations adapted to penetrate the wall of the bore of the parent body to lock said member in the bore, the inner of said members being externally and internally threaded, the external threads of said inner member being in threaded engagement with the inner threads of the outer member, said inner member being provided with a counterbore at one end thereof juxtaposed the counterbore of the outer member opposite the outer member end which is provided with external serrations, said counterbored end of said outer member opposite said end which is provided with external serrations being provided with inwardly deformed tongue means, said counterbored end of said inner member being provided with slot means, said inner member being in non-rotatable locking engagement relative to said outer member by said inwardly deformed tongue means carried by said outer member being interlocked with said slot means carried by said inner member.

5. In a two-piece insert for connection with a body of material having a surface, the combination of an external body having outer threads and a threaded bore, one end of said outer body forming a radially and outwardly deformable head having a counterbore, a plurality of locking projections on said head, a counterbore at the opposite end of said outer body, said opposite end being radially and outwardly deformable and an externally and internally threaded locking member in the bore of said outer body, the external threads of said locking member being in engagement with the threads of said internal bore of said outer member, said inner member having a counterbore forming a thin wall and adapted to be outwardly deformed into locking engagement with the counterbore of the outer member at the end of said outer member opposite said locking formations carried thereby, a circumferential portion of said internal locking member limited in axial dimension being deformed inwardly so as to provide means adapted to lock a screw threaded therein.

References Cited in the file of this patent

UNITED STATES PATENTS

| | | |
|---|---|---|
| 1,692,497 | Furlan | Nov. 28, 1928 |
| 2,577,810 | Rosan | Dec. 11, 1951 |
| 2,742,938 | Neuschotz | Apr. 24, 1956 |
| 2,754,882 | Rosan | July 17, 1956 |
| 2,791,787 | Neuschotz | May 14, 1957 |
| 2,877,817 | Rockwell | Mar. 17, 1959 |
| 3,054,436 | Rosan | Sept. 18, 1962 |
| 3,065,983 | Flumerfelt | Nov. 27, 1962 |
| 3,081,808 | Rosan et al. | Mar. 19, 1963 |

FOREIGN PATENTS

| | | |
|---|---|---|
| 90,093 | Norway | Sept. 30, 1957 |